UNITED STATES PATENT OFFICE.

LOTHAR FIEDLER, OF STOKE NEWINGTON, ENGLAND.

SECONDARY BATTERY.

No. 896,981.   Specification of Letters Patent.   Patented Aug. 25, 1908.

Application filed February 25, 1907. Serial No. 359,257.

*To all whom it may concern:*

Be it known that I, LOTHAR FIEDLER, of 22½ Cazenove road, Stoke Newington, in the county of Middlesex, England, have invented certain new and useful Improvements in Secondary Batteries; and I do hereby declare the following to be a full, clear, and exact description of the invention, such as will enable others skilled in the art to which it appertains to make and use the same.

This invention relates to improvements in secondary batteries and consists in the production of a lead paste which, without containing, in admixture therewith, any foreign body, has, when first prepared, the consistency of a soft adherent mass adapted to be molded with facility so as to completely occupy the interstices of a lead frame or grid and thereafter, in a short time, to become very hard and, after further treatment as will be presently described, to constitute a very durable, finely porous, highly conductive plate for a secondary battery, capable of being discharged to an unusual degree without detriment and immune to the deteriorating influence of the sulfuric acid electrolyte, though left uncharged for a considerable time.

The invention consists in producing a cementitious plastic mass by the addition of lead oxid to a compound solution derived by mixing lead acetate with phenol, (carbolic acid). The addition of the solution to the lead oxid results in the generation of heat and the product which at first is a moldable paste quickly sets as a hard concrete. The phenomena are much like those which attend the mixing of water with plaster of paris and the hardening is probably due to the same kind of cause, namely the formation of a crystalline molecular structure.

The process is applicable to the production of a positive-pole plate as well as the production of a negative-pole plate the difference consisting in the nature of the lead oxid which it is preferable to use.

In carrying out the operation I take three parts of a 10% solution of lead acetate and add to it one part of a 10% solution of phenol, (carbolic acid), with the result that I obtain a liquid compound known as lead-phenylate-acetate.

To produce a plate which, on the discharge of the battery is intended to be a positive pole plate, I now add to the above described liquid as much powdered minium, as will produce a coherent plastic mass. On the addition of the minium a molecular or chemical reaction will take place resulting in the production of heat, and the formation of a coherent paste of lead compounds. The paste thus formed should now be worked in, to completely fill the interstices of the grid in a compact manner and afterwards subjected to artificial heat which will quickly render the paste very hard and by the evaporation of the acetic acid cause it to be finely porous. The plate is then washed to remove the remnants of free acetic acid.

The lead peroxid produced by electrolytic oxidation of the paste thus prepared will be exceedingly hard and finely porous and, on account of the absence of binding substances of a non-conductive character, it is an excellent conductor of electricity.

To produce in a similar manner, a plate to act on discharge as a negative-pole-plate, litharge, instead of minium, is added to the solution of lead-phenylate-acetate or, instead of litharge simple, a mixture consisting of about two-thirds litharge and one-third minium. The same kind of chemical reaction will take place resulting in the production of heat and the formation of a paste which will be plastic and adherent. By electrolytical reduction such a plate will become a tough compact porous sheet of metal adapted throughout its mass to amalgamate with mercury.

I claim.

1. A plate for secondary batteries comprising a grid, an adherent paste, said paste consisting of lead oxid mixed with a solution which results from the addition of lead acetate to phenol.

2. A plate for secondary batteries comprising a grid having interstices therein, said interstices being filled by molded portions of prepared lead oxid of a hard, compact and porous nature inserted in the interstices while in soft, pasty condition due to the mixture of lead phenylate-acetate with lead oxid.

3. A negative pole plate comprising a grid, and an adherent paste comprising litharge mixed with an acrid solution of lead phenylate-acetate.

4. A negative pole plate for secondary batteries comprising a grid, an adherent paste composed of litharge, and minium mixed with an acrid solution of lead phenylate-acetate.

In testimony whereof I have hereunto set my hand in the presence of two subscribing witnesses.

LOTHAR FIEDLER.

Witnesses:
   FREDERICK W. LANE,
   H. D. JAMESON.